United States Patent
Bond et al.

[11] Patent Number: 5,933,446
[45] Date of Patent: Aug. 3, 1999

[54] BEAMFORMER WITH ADAPTIVE PROCESSORS

[75] Inventors: James W. Bond, San Diego, Calif.; Henry J. Schmidt, Silver Spring, Md.

[73] Assignee: The United States of America as represented by the Secretary of the Navy, Washington, D.C.

[21] Appl. No.: 08/537,374

[22] Filed: Oct. 2, 1995

Related U.S. Application Data

[63] Continuation-in-part of application No. 07/707,352, May 29, 1991, Pat. No. 5,517,531, application No. 07/707,354, May 29, 1991, Pat. No. 5,499,399, application No. 07/713,660, Jun. 11, 1991, Pat. No. 5,544,199, application No. 07/713,659, Jun. 11, 1991, Pat. No. 5,509,032, and application No. 07/766,618, Sep. 25, 1991, Pat. No. 5,495,497.

[51] Int. Cl.$^6$ .............................. H04B 1/69; H04B 7/10
[52] U.S. Cl. ........................ 375/200; 375/347; 342/196; 342/354
[58] Field of Search .................................. 375/234, 200, 375/347; 342/196, 354, 378; 455/133, 137, 135, 562

[56] References Cited

U.S. PATENT DOCUMENTS

| | | | |
|---|---|---|---|
| 5,388,123 | 2/1995 | Uesugi et al. | 375/234 |
| 5,425,000 | 6/1995 | Reed et al. | 367/131 |
| 5,563,909 | 10/1996 | Nakazawa | 375/347 |
| 5,621,752 | 4/1997 | Antonio et al. | 375/200 |

*Primary Examiner*—Don N. Vo
*Attorney, Agent, or Firm*—Harvey FEndelman; Michael A. Kagan; Peter A. Lipovsky

[57] ABSTRACT

The Beamformer with Adaptive Processors is a practical joint spatial-temporal processor suitable for combining multiple antenna signals for a communications receiver. The invention identifies a beam or beams, amongst a discreet set of fixed beams, for which adaptive locally optimum processing will most likely reveal the presence of a weak signal. The invention chooses a suitable form of adaptive locally optimum processing according to the nature of the beam or beams identified. The beam or beams are selected for adaptive locally optimum processing depending on several simple characteristics of a Fast Fourier Transform (FFT) of each beam's output. These are $\Sigma\sigma^2$, D, and B (the sum of the squares of the Fourier coefficients, the number of distinct peaks amongst these coefficients, and the total number of coefficients defining the peaks, respectively). A simple logic table is used to define the beam or beams to be used for adaptive processing and to define the nature of the adaptive processing to be used on the beams identified to most likely reveal the presence of a weak signal. The result of the combination of selecting the most promising beam or beams and appropriately adaptively processing the beam or beams is a near optimal implementation of a joint temporal-spatial processor.

1 Claim, 2 Drawing Sheets

BEAMFORMER WITH ADAPTIVE PROCESSORS

CROSS-REFERENCE TO RELATED APPLICATIONS AND INCORPORATION BY REFERENCE

This application is a continuation-in-part of the following applications:

Ser. No. 07/707,352 filed May 29, 1991 which is U.S. Pat. No. 5,517,531 issued May 14, 1996, Ser. No. 07/707,354 filed May 29, 1991 which is U.S. Pat. No. 5,499,399 issued Mar. 12, 1996, Ser. No. 07/713,660 filed Jun. 11, 1991 which is U.S. Pat. No. 5,544,199 issued Aug. 5, 1996, Ser. No. 07/713,659 filed Jun. 11, 1991 which is U.S. Pat. No. 5,509,032 issued Apr. 16, 1996; and Ser. No. 07/766,618 filed Sep. 25, 1991 which is U.S. Pat. No. 5,495,497 issued Feb. 27, 1996.

These allowed applications are incorporated by reference herein.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to the suppression of interference amongst communication signals.

Military communications are often conducted in an environment that contains two or more interfering signals. For underwater communications using the very low frequency (vlf) radio band and submerged crossed-loop antennas, only two degrees of spatial freedom exists. As a result, beamforming by itself is only able to cancel a single interferer.

Traditional beamforming techniques are based on steering beams so that interfering signals on the beams have minimum magnitude. Another approach to beamforming for two or more antennas has been through the use of the eigenvalues of the cross-correlation matrix of the antenna signals as the steering directions for the beamformer. This technique works well for one or two interferers, providing that in the case of two interferers, the two interferers are received with powers differing by a factor of two or more.

Adaptive locally optimum processing can also be used to minimize interference, so that weak communication signals can be detected in an interference environment. These techniques process either or both of the amplitude and phase of a complex sample of the received signal. The capability of the processing to mitigate against interference, however, depends on the variability of the amplitude or phase of the interference and not primarily on its power.

Heretofore, there has not been a way to use beamforming together with adaptive locally optimum processing to effectively mitigate interference when two or more interferers are present.

There is thus a need for a practical processor that permits the use of beamforming together with adaptive locally optimum processing to provide effective interference mitigation for processing the outputs of several radio antennas when two or more interferers are present.

SUMMARY OF THE INVENTION

The Beamformer with Adaptive Processors is a practical joint spatial-temporal processor suitable for combining multiple antenna signals for a communications receiver. The invention identifies a beam or beams, amongst a discrete set of fixed beams, for which adaptive locally optimum processing will most likely reveal the presence of a weak signal. The invention chooses a suitable form of adaptive locally optimum processing according to the nature of the beam or beams identified. The beam or beams are selected for adaptive locally optimum processing depending on several simple characteristics of a Fast Fourier Transform (FFT) of each beam's output. These are $\Sigma\sigma^2$, D, and B (the sum of the squares of the Fourier coefficients, the number of distinct peaks amongst these coefficients, and the total number of coefficients defining the peaks, respectively). A simple logic table is used to define the beam or beams to be used for adaptive processing and to define the nature of the adaptive processing to be used on the beams identified to most likely reveal the presence of a weak signal. The result of the combination of selecting the most promising beam or beams and appropriately adaptively processing the beam or beams is a near optimal implementation of a joint temporal-spatial processor.

OBJECTS OF THE INVENTION

It is an object of this invention to provide an improved interference suppression system.

Another object of this invention is provide a practical spatial-temporal processor suitable for processing the outputs of a plurality of radio antennas.

A further object of this invention is to provide an improved interference suppression system that provides a practical way of using beamforming together with adaptive locally optimum processing to provide effective interference mitigation against two or more interferers present in the outputs of a plurality of radio antennas.

Yet a further object of this invention is to identify the beam or beams, amongst a discrete set of fixed beams, for which adaptive locally optimum processing is most likely to reveal the presence of a weak signal.

Yet a further object of this invention is to provide an interference suppression system that identifies the beam or beams, amongst a discrete set of fixed beams, for which adaptive locally optimum processing is most likely to reveal the presence of a weak signal and which beam or beams are processed by an adaptive locally optimum processing technique selected according to the nature of the beam or beams identified.

Other objects, advantages, and new features of the invention will become apparent from the following detailed description of the invention when considered in conjunction with the accompanying drawings.

DESCRIPTION OF THE PREFERRED EMBODIMENT

Figure 1:
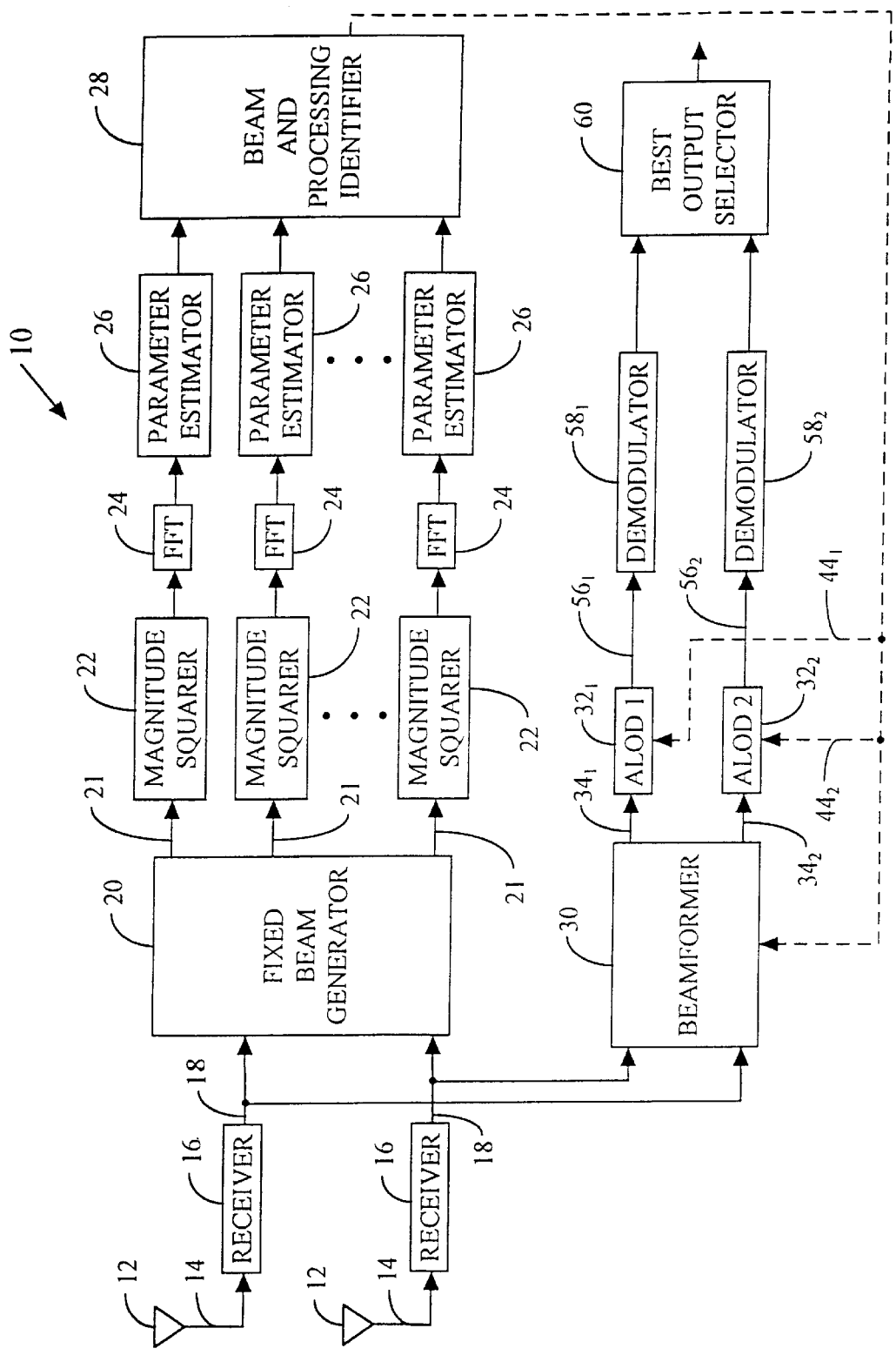
FIG. 1 is a block diagram of a representative implementation of a Beamformer with Adaptive Processors according to one embodiment of the invention.

Referring to FIG. 1, a Beamformer with Adaptive Processors 10 according to a representative embodiment of the invention is shown. System 10 can be used with any bandspread communications signal. The exemplary embodiment of the invention shown in FIG. 1 illustrates the usage of two receiving antennas. The spatial-temporal processor System 10 shown provides a practical solution for mitigating the effects of interference received upon two antennas; however, those skilled in the art will realize that the invention may be adapted for the use with additional antennas.

Referring once again to System 10 of FIG. 1, receiving antennas 12 have outputs 14 that are processed by identical receivers 16 to generate baseband digital samples 18 in the bandwidth (BW) of interest. The frequency of the bandwidth sampling is of course chosen by the user. It is known however, by way of simulation, that bandwidth samples taken at four times the bandwidth of the modulated bandspread communication signal can be suitable for vlf applications.

A fixed beam generator 20, that is, one that generates beams in fixed directions, is used so that for each sample time the baseband sample for each antenna are linearly combined in multiple ways to form equally spaced beams. The beams, for example, could be chosen to span 180 degrees at ten-degree intervals, for example 5 degrees, 15 degrees, . . . , 185 degrees. The linear combining is done in a conventional way. For example, $A\cos\Theta + B\sin\Theta$, $\Theta = 0, \Pi/N, 2\Pi/N, \ldots, (N-1)\Pi/N$ where N is a positive integer.

In this case, A is the baseband signal of the first antenna and B is the baseband signal representative of that received on a second antenna.

Each beam output 21 is used as processor "input data" that first has its magnitude squared in magnitude squarer 22 the output of which is used as input to a Fast Fourier Transform (FFT) 24 of length $2^n$ with n chosen so that $BW/2^n$ is on the order of the narrow band interference anticipated to exist with the communication signal. For example, $BW/2^n < 10$ Hz would be suitable for vlf communications. A total of B successive transforms are made from each beam output "B" being a whole number. Within parameter estimator 26, for the B successive transforms corresponding to each beam, the next step is to average the magnitude squared of each Fourier coefficient corresponding to beamformed signal energy in individual frequency bins or bands of the Fast Fourier Transform 24. The table below illustrates the Fourier coefficients taken from a single beam.

| | FOURIER COEFFICIENTS | | | |
|---|---|---|---|---|
| Input Data Samples | FREQ. $BIN_{(0)}$ | FREQ. $BIN_{(1)}$ | FREQ. $BIN_{(2n-1)}$ | (IDS) |
| $IDS_1 \to FFT$ | $C_0^2(1)$ | $C_1^2(1)$ | ... $C_{2N-1}^2(1)$ | {transform 1 |
| $IDS_2 \to FFT$ | $C_0^2(2)$ | $C_1^2(2)$ | ... $C_{2N-1}^2(2)$ | {transform 2 |
| $IDS_B \to FFT$ | $C_0^2(B)$ | $C_1^2(B)$ | ... $C_{2N-1}^2(B)$ | {transform B |
| | $\frac{1}{k}ZC_0^2(k)$ | $\frac{1}{k}ZC_1^2(k)$ | $\frac{1}{k}ZC_{2N-1}^2(k$ | {avg. mag.$^2$ {coeffs. |

For each beam, the magnitude squares of the beam output are used as an input data stream (IDS) to develop a first transform whose Fourier coefficients are determined, shown above as transform 1. Additional data streams for the same beam are used to develop additional transforms until the desired B successive transforms are developed for each beam.

For each beam (bm), let $\phi_{bm}^2$ denote the beam's maximum average-of-the-magnitude-squared-Fourier-coefficient.

The invention then chooses the beam or beams that will provide their respective input data for use in adaptive processing in the following way. There are two basic situations in which Fourier coefficients generated from a beam can exhibit one or more peaks, or not exhibit a peak. A "Peak" is defined herein as a beam's average magnitude-squared Fourier coefficient whose magnitude is a specified amount above the average of the average magnitude-squared Fourier coefficients determined from B transforms for that beam, in this example such a peak is chosen to be four or more times the average magnitude value of the average of the average magnitude squared Fourier coefficients generated by the Fourier transforms of a given beam.

If the Fourier transform data from a particular beam does not exhibit a peak, then according to the invention $D_k$ (the number of distinct peaks among the coefficient) is set to one and $B_k$ (the total of number of coefficients defining the peaks) is set equal to $2^n$ (the number of frequency bins or bands corresponding to the length of the transform). Otherwise, let $D_k$ denote the number of peaks for the average-magnitude-squared-coefficient which are four or more times the average of the average-magnitude-squared-coefficient for a beam and let $B_k$ denote the total number of adjacent Fast Fourier bins or bands about each peak which are greater than $\frac{1}{4}\sigma_p^2$ where $\sigma_p^2$ is the magnitude of a peak.

Referring once again to FIG. 1, for a beam or beams selected for adaptive processing, Beam Processing Identifier 28 generates control signals to Beamformer 30 in the following way. Let $\phi_1^2$ and $\phi_2^2$ denote the two lowest values of the $\phi_{bm}^2$ and let bm1 and bm2 denote the two beams with these values. Depending on the angular difference between these two beams, it has been found that if the beams differ by less than or equal to 30° (at 30° the signal being at half power), then adaptive locally optimum processing should be done of the beam with the minimum average, average-magnitude-squared Fourier coefficient of the two beams and adaptive locally optimum processing should be done of a second beam 90° different from this beam, otherwise both beams, $bm_1$ and $bm_2$ should be processed.

The Beam Processing Identifier 28 also generates control signals used to effectuate Adaptive Locally Optimum Detection Processors (32) $ALOD_1$ and $ALOD_2$.

Figure 2:
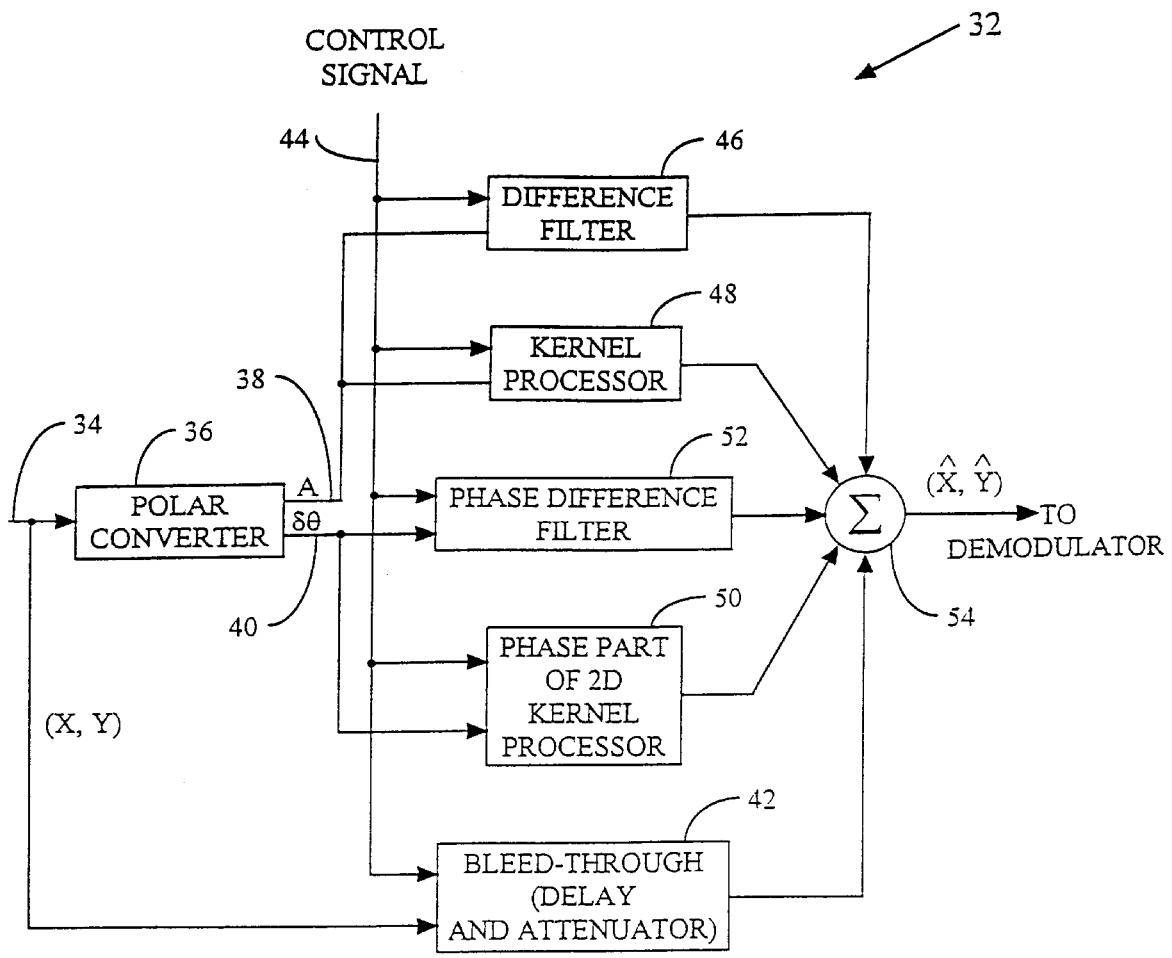
FIG. 2 is a block diagram of an adaptive locally optimum detection (ALOD) processing element as may be utilized with the implementation of the invention illustrated in FIG. 1.

Referring now to FIG. 2, a representative embodiment of such an ALOD Processor 32 is shown. Beam output baseband samples 34, also shown as beam output 21 of FIG. 1, are used as input data to ALOD Processor 32 and are first fed to a buffer (not shown) to delay the data until the beamformed data has been processed to determine which beam or beams should be used for adaptive processing. The output of the buffer is the input to polar convertor 36 such as that described in applicant's previously filed patent application U.S. Pat. No. 5,499,399 issued Mar. 12, 1996 the output of which is the amplitude (38) and phase difference (40) of the baseband samples. The baseband samples 34 used as input data to processor 32 are also fed directly to a bleed-through path 42 to be used when communication signals are nearly as strong or are stronger than interference. Such a bleed-through path is described in the applications referenced earlier in this specification.

Control signals 44 are generated within Beam Processing Identifier 28 of FIG. 1 as follows:

(a) If the beam has Fourier coefficients without a peak ($D_k=1$), then processing of the beams output should be by way of a tracking amplitude algorithm processor 46 in conjunction with bleed-through path 42. One such a tracking amplitude algorithm processor that could be used has previously been described in an earlier filed patent application U.S. Pat. No. 5,509,032 issued Apr. 16, 1996 in which this processor is known as a "Difference Filter" processor.

(b) If the beam has Fourier coefficients with one or more peaks, ($D_k>=1$), and if $B_k$ is less than BW/10, then (1) if only one peak is present, the beam's output should be used as input data to a kernel amplitude processor 48 utilized with a phase processor 52. Such kernel amplitude processing could be done be way of applicant's previously disclosed "Kernel Adaptive Interference Suppression System" described and claimed in U.S. Pat. No. 5,517,532 issued May 14, 1996. The phase processing could be done by way of the "Phase Difference Filter" previously described by applicant in U.S. Pat. No. 5,544,199 issued Aug. 6, 1996.

(2) if more than one peak is present, the phase processing could be done by kernel phase processor 48 in conjunction with kernal phase filter 50. Such kernel amplitude processing could by done be way of applicant's previously disclosed "Kernel Adaptive Interference Suppression System" described and claimed in U.S. Pat. No. 5,517,532 issued May 14, 1996. The phase processing could be done by way of the phase part of the "2D Kernel ALOD Processor" previously described by applicant in U.S. Pat. No. 5,499,399 issued Mar. 12, 1996.

(c) If the beam has Fourier coefficients with one or more peaks and if $B_k$ is >=BW/10 then the processing to be used should consist of a kernel amplitude processor 48 with bleed-through path 42. Such a kernel amplitude processor that could be used has been previously described in U.S. Pat. No. 5,517,532 issued May 14, 1996.

The output of the processors and/or bleed-through path are combined in summer 54.

Referring to FIG. 1, summer output 56 is demodulated in demodulator 58 with the results being compared in a "best" output selector 60 so as to choose the demodulated output with highest estimated signal-to-noise level that should be further processed to format the communicated information and to display it.

The adaptive processors described herein have all been previously disclosed in the cited patents referenced in this specification. For completeness, these processors will be briefly described.

An Adaptive Locally Optimum Detection Processor (ALOD$_1$ or ALOD$_2$ of FIG. 1) can be configured to implement the following processing algorithms. For baseband samples x and y let $r_j^2 = x_j^2 + y_j^2$ and $r_j > 0$. An amplitude processing algorithm forms a gain factor $g(r_j)$ which relates the input sequence to the output sequence as given by the relation $(x_j\hat{}, y_j\hat{}) = g(r_j) (x_j/r_j, y_j/r_j)$. The gain factor $$g(r_j) = \sum_{k=j-N}^{j+N} (r_{j+k} - r_j)$$

for an amplitude tracking algorithm U.S. Pat. No. 5,509,032 issued Apr. 16, 1996 and $$= \frac{\sum_{k=j-N}^{j+N} (r_{j+k} - r_j) K(k, j)}{\sum_{k=j-N}^{j+N} K(h, j)}$$

U.S. Pat. No. 5,517,532 issued May 14, 1996 where $$K(k, j) = e^{-\frac{(r_{j+k} - r_j)^2}{2\sigma_j^2}},$$

$\sigma_j^2$ is the variance of the sample amplitudes $\{r_{j+k}|-N \leq k \leq N\}$, and the integer N is a power of 2. The preferred realization of the processor for this invention has N=8. A phase processing algorithm has the form: $(x_j\hat{}, y_j\hat{}) = h(\Theta) (-y_j, x_j)$. The gain factor $$h(\theta_j) = \sum_{k=j-N}^{j+N} (\theta_{j+k} - \theta_j)$$

U.S. Pat. No. 5,495,497 issued Feb. 27, 1996 for a phase tracking algorithm and the form $$\frac{\sum_{k=j-N}^{j+N} (\delta(\theta_{j+k}) - \delta(\theta_j)) K(k, j)}{\sum_{k=j-N}^{j+N} K(k, j)}$$

U.S. Pat. No. 5,499,399 issued Mar. 12, 1996 where $$K(k, j) = e^{-\frac{(\delta(\theta_{j+k}) - \delta(\theta_j))^2}{\sigma_j^2}},$$

$\sigma_j^2$ is the variance of the sample phase-differences $\{\delta(\Theta_{j+k})|-N \leq k \leq N\}$, with $\delta(\Theta_{j+k}) = \Theta_{j+k} - \Theta_{j+k-1}$, and N is a power of 2. The preferred realization of the processor for this invention has N=8. See U.S. Pat. No. 5,544,199 issued Aug. 6, 1996, and U.S. Pat. No. 5,509,032 issued Apr. 16, 1996. If both amplitude and phase processing are used, the processing outputs are simply added as described in U.S. Pat. No. 5,499,399 issued Mar. 12, 1996. If a bleed-through term is needed, it consists of delayed and attenuated version of the baseband samples from the Beamformer added to the processing algorithm output, as described in the referenced allowed applications.

The invention is the first practical implementation of a near-optimum spatial-temporal processor suitable for processing the outputs of two radio antennas. It provides a capability to mitigate against two strong interferers when the interfering signals arrive at the receiver from different directions. Use of either spatial or temporal processing by itself does not provide as effective a mitigation of interference and available technologies for combining spatial and temporal processing prior to this invention have not performed nearly as well for important scenarios, including the case of narrow band and broad band interferers with the narrow band interferer being stronger than the broad band and the interferer's signals arriving at the receiver from different directions.

Obviously, many modifications and variations of the invention are possible in light of the above teachings. It is therefore to be understood that within the scope of the appended claims the invention made be practice otherwise than as has been specifically described.

What is claimed is:

1. A method comprising the steps of:

receiving signals from multiple sources;

sampling said signals to get digital signal samples;

beamforming said digital signal samples into a plurality of beams to produce beam output samples for each beam, each beam output sample being characterized by a magnitude;

squaring said magnitudes to get magnitude squared samples;

Fast Fourier Transforming said magnitude squared samples to get Fast Fourier coefficients corresponding to beamformed signal energy in individual frequency bands for each of said beams;

forming magnitude squares of said Fourier coefficients;

repeating the above steps of Fast Fourier Transforming and forming magnitude squares for B transforms, B being a whole number;

averaging said magnitude squared Fourier coefficients corresponding to said individual frequency bands for each of said B Fourier Transforms for each beam;

averaging the average magnitude squared Fast Fourier coefficients for each beam;

selecting beams for adaptive processing wherein said selection is based upon minimum average, average magnitude-squared Fast Fourier coefficients, beam steering direction difference, and magnitude peaks exhibited within said average magnitude squared Fast Fourier transform coefficients;

processing selected beams by selected adaptive processors;

combining said adaptive processor outputs; and demodulating said combined output.

* * * * *